United States Patent [19]
Paulsen et al.

[11] Patent Number: 5,474,401
[45] Date of Patent: Dec. 12, 1995

[54] PULSE-CONTROLLED METERING DEVICE

[75] Inventors: Knut A. Paulsen, Avaldsnes; Bernt Nagell, Haugesund; Gisle G. Enstad, Os; Bjørn Vikshåland, Håvik; Leiv Ognedal, Porsgrunn, all of Norway

[73] Assignee: Norsk Hydro a.s., Oslo, Norway

[21] Appl. No.: 174,362

[22] Filed: Dec. 28, 1993

[30] Foreign Application Priority Data

Dec. 29, 1992 [NO] Norway .................................. 925027

[51] Int. Cl.⁶ ..................................................... B65G 53/18
[52] U.S. Cl. ................................................. 406/85; 406/89
[58] Field of Search ................................. 406/89, 90, 91, 406/85, 123, 138, 155, 122, 164, 133, 167

[56] References Cited

U.S. PATENT DOCUMENTS

| | | | |
|---|---|---|---|
| 2,740,671 | 4/1956 | Sayre | 406/89 |
| 4,220,426 | 9/1980 | Ply | 406/89 |
| 5,360,297 | 11/1994 | Enstad et al. | 406/89 |

FOREIGN PATENT DOCUMENTS

| | | |
|---|---|---|
| 2063649 | 9/1992 | Canada . |
| 2288696 | 5/1976 | France . |
| 3125045 | 1/1983 | Germany . |
| 1442298 | 7/1976 | United Kingdom ..................... 406/89 |

*Primary Examiner*—Stephen Avila
*Attorney, Agent, or Firm*—Wenderoth, Lind & Ponack

[57] ABSTRACT

A pneumatic metering device for metering powdered materials, for example in connection with feeding aluminum oxide and aluminum fluoride to an electrolysis cell for production of aluminum, includes a container in the form of a relatively long, closed channel or similar structure. A fluidizing element is fitted in the base of the channel for supply of air for fluidization of material which is located in the channel. The container is fitted with an inlet for feeding material to the container from a store in the form of a silo or similar and an outlet for metered discharge of material from the container. The area below the inlet is inactive and is not supplied with fluidizing air, whereas air is supplied intermittently to the fluidizing element which is designed to cover essentially all other parts of the base of the channel.

5 Claims, 2 Drawing Sheets

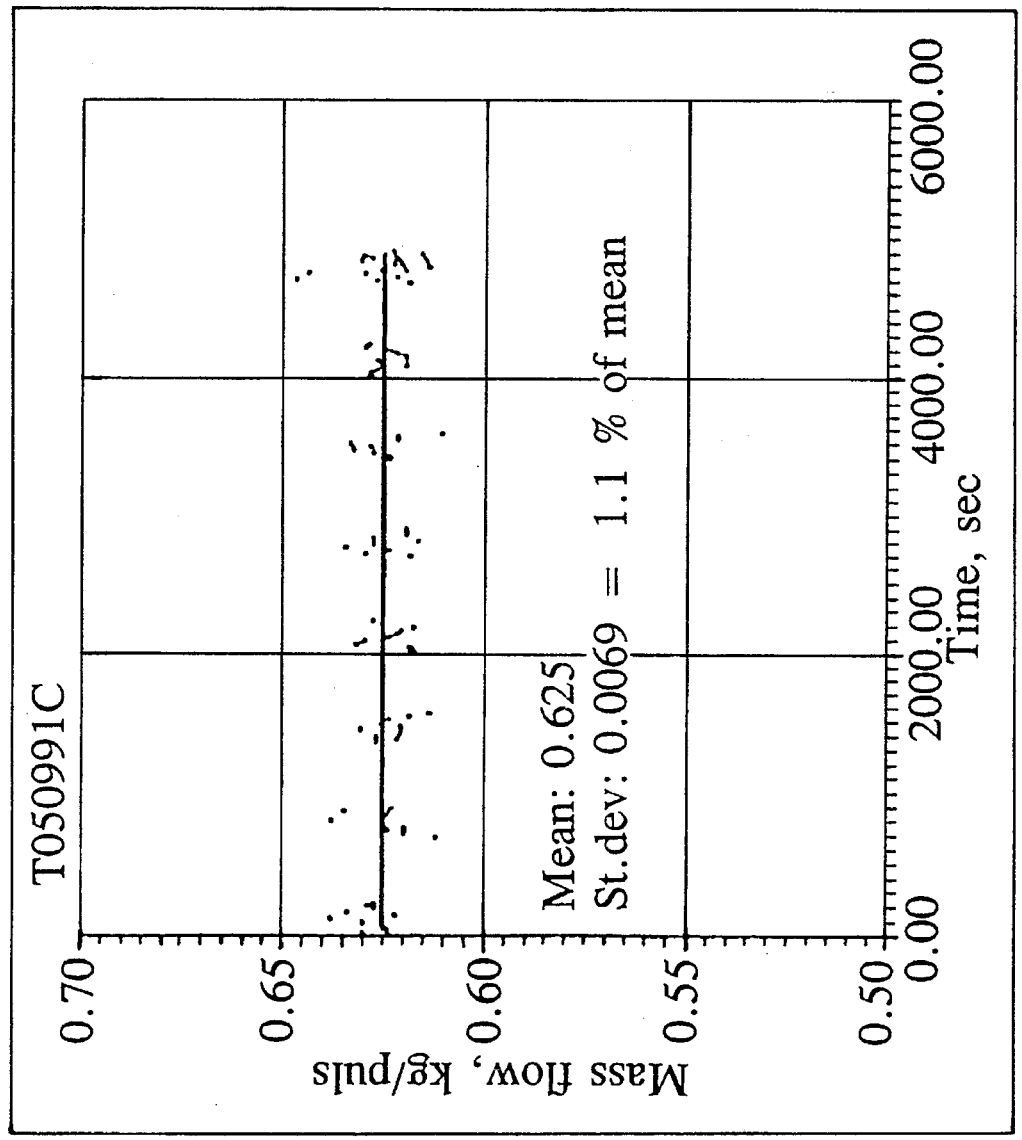

PULSE-CONTROLLED METERING DEVICE

BACKGROUND OF THE INVENTION

The present invention concerns a pneumatic dosage or metering device for metering powdered materials, for example in connection with feeding aluminum oxide and aluminum fluoride to an electrolysis cell for the production of aluminum, a container in the form of a relatively long, closed channel or similar structure with a fluidizing element fitted in the base of the channel for air supply for fluidization of material located in the channel. In addition, the container is fitted with an inlet for feeding material from a store in the form of a day tank, silo or similar source and an outlet for metered discharge of material from the channel.

There are previous devices of the above type in which transportation and metering take place in accordance with the fluidization principle. The prerequisite for being able to use such devices is that the material which is to be transported and metered is fluidizable, i.e. that it is pulverulent and has such granulometry and cohesion that the inlet air flow speed slowly forces decohesion between particles and a reduction of internal friction forces, causing the thus formed suspension to behave essentially as a homogenous fluid. Such materials include aluminum oxide used for smelting electrolysis as mentioned above, cements and plaster, slaked or unslaked lime, calcium fluoride, charger for plastic and rubber, catalysts, powdered carbon, sodium hydrogensulphate, phosphates, poly-phosphates, pyrophosphates, metal powder, pulverulent plastic materials, food products such as flour, milk powder, sugar, etc.

The inventors have been working on the transportation and metering of fluidizable material for a number of years during which they have tried to find the simplest, most reasonably priced and most durable solutions in practice. In this connection, attention is directed to, Norwegian Patent No. 162774 corresponding to U.S. Pat. No. 4,930,691 and Norwegian Patent Application No. 911178, corresponding to U.S. Pat. No. 5,360,297. The first of these arrangements relates to a metering device based on a type of volumetric metering in which, by means of fluidization, material flows from a store via a fluidizing channel to a fluidizing container where it is collected in a certain quantity, depending on the size of the container. When the container is full, the air supply to the fluidizing channel is stopped and air is supplied to the container so that the material in the container is fluidized and consequently discharged. This is, in fact, a simple solution which provides accurate doses but the size of the doses is difficult to adjust.

The second arrangement relates to a fluidizing channel for automatic level control for which an inactive zone, i.e. a zone which is not fluidized, is used in the area below the channel inlet for the fluidizable material. This channel cannot be used for metering purposes in the form in which it is shown and described.

SUMMARY OF THE INVENTION

On the basis of the experience gained by the inventors through long-term work with metering and transportation of fluidizable material, in accordance with the present invention they have designed a new metering device for such fluidizable material which is simpler than the metering device shown in the above-mentioned first prior arrangement has a lower construction height and is more flexible regarding the possibility of adjusting the size of the individual dose. The invention is based on time-control of fluidizing air powder and is characterized in that the area under the inlet for feeding material to the container is inactive and is not supplied with fluidizing air, whereas air is supplied intermittently to the fluidizing element which is essentially designed to cover all other parts of the container base.

BRIEF DESCRIPTION OF THE DRAWINGS

The present invention will now be described in further detail by ways of example and with reference to the attached drawings in which FIG. 2 is a graph showing results following tests with the device shown in FIG. 1.

DETAILED DESCRIPTION OF THE INVENTION

Figure 1:
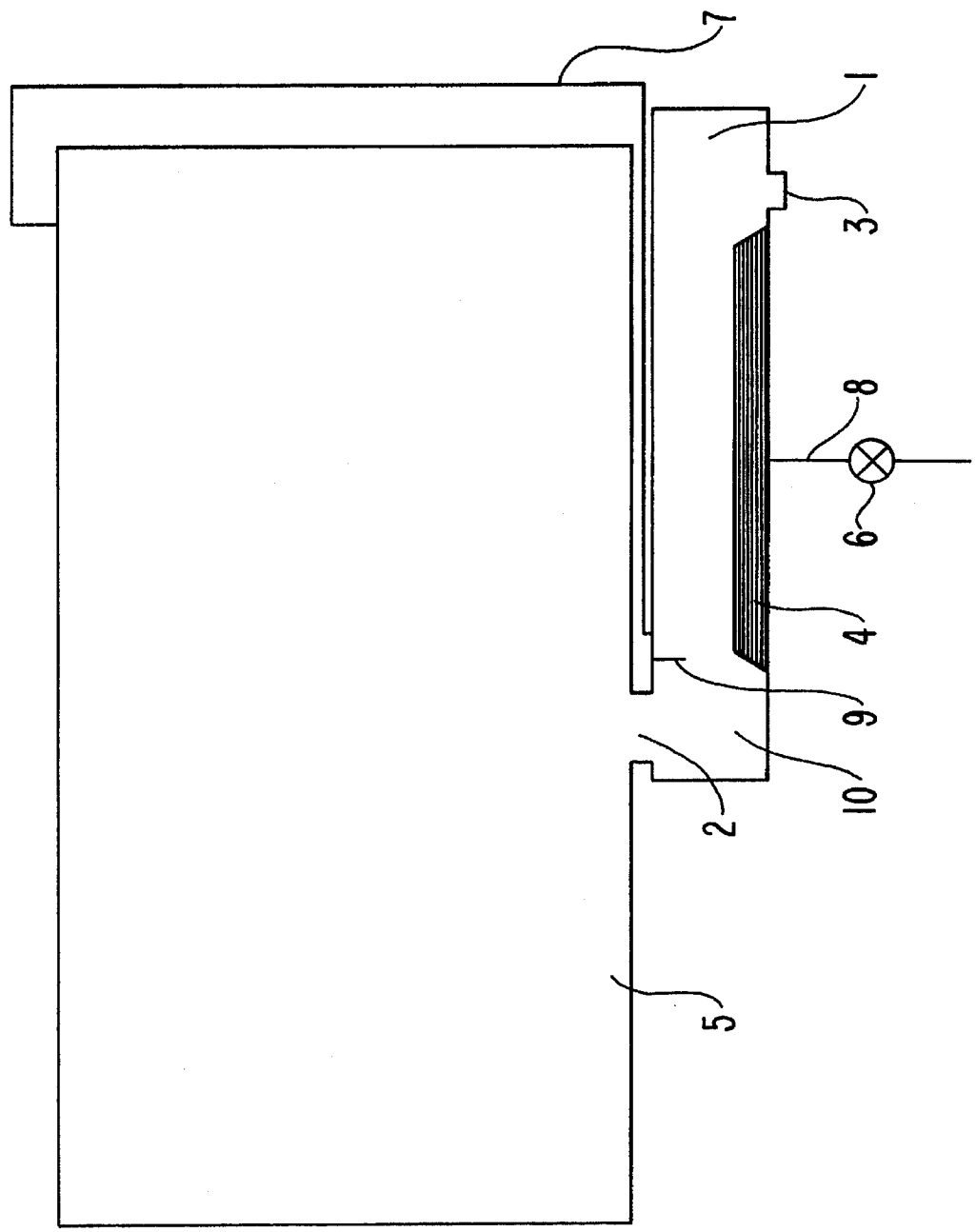
FIG. 1 is a schematic view of a pneumatic dosage or metering device in accordance with the present invention.

As shown in FIG. 1, the metering device in accordance with the present invention includes a container in the form of a long, closed channel 1 with an inlet 2 and an outlet 3 as well as a fluidizing element 4 fitted in the base of the container. The fluidizing element may be detachable and of the type described in Norwegian patent application No. 920981, or it may be of a standard type with a canvas which is stretched out over the base at a distance therefrom and attached to the channel. As FIG. 1 shows, the area below the inlet 2 is not fitted with a fluidizing element and is thus not fluidized (the area is inactive). The aim of this is to prevent fluidization of material which is located in the overhead store, i.e. in a tank 5. Tests have shown that in connection with fluidization of this area deviations occurred in the dose quantity metered which depended on the material quantity (the degree of filling) in the tank, and metering inaccuracy increased considerably.

Regarding the fluidizing element, pressure is supplied thereto via an electronically controlled magnetic valve 6 via a pipe conduit 8 from a compressed-air source (not shown). The electronic control unit is programmable so that the material doses to be metered can be increased or decreased by increasing or reducing the pressure pulse length, respectively, and/or by varying the pressure pulse frequency.

Even though it is not shown in FIG. 1, the tank 5 is also fitted with a fluidizing element to fluidize material in the tank at regular intervals. This is necessary to ensure that material is transported towards the inlet 2. The electronic control unit also controls the valve (not shown) which opens for the air supply to the tank. It is important that this air supply to the tank 5 does not coincide with the air supply to the channel 1. In such case material would flow from the tank through the channel, which would result in larger deviations in the doses metered.

Moreover, the channel can be fitted with an air vent 7. However, as air consumption is very low during metering, this will normally not be required.

In addition, a transverse, downwardly extending restriction 9, as shown in FIG. 1, is fitted above the end of the fluidizing element 4 next to the inlet 2. For practical purposes this may be slidable towards and away from the inlet 2 in order to adjust (optimize) the size of the doses. The main aim of this restriction is, however, to hold back the powder in the channel while the tank 5 is being refilled.

The metering device in accordance with the present invention operates as follows:

Material is filled into the tank 5 up to the level required. The electronic control unit is subsequently adjusted so that, for example, it meters out one dose per 20 seconds with a pulse length of four seconds and with fluidization of material in the tank between every fifth pulse. While the tank is being filled, the material will flow down into the channel 1 through inlet 2. When the control unit gives off a signal to the magnetic valve 6, the valve opens so that air is supplied to the channel. The material in the channel is subsequently fluidized and flows out through the outlet 3. At the same time new material will flow into the channel until four seconds have passed and the air supply is shut off. One dose has now been metered and additional doses will be metered in accordance with the same procedure every 20 seconds.

A number of studies/tests have been carried out with the present invention in which a metering device has been used with a basic design as shown in FIG. 1. The result of one of these studies has been shown in further detail in FIG. 2. During this study the electronic control unit was set at a pulse of four seconds every 20 seconds, which was equivalent to a mean metered quantity of 0.625 kg per pressure pulse. As FIG. 2 shows, dose variation is very low with a standard deviation of 0.0069, equivalent to 1.1%. Air consumption is also very low, 1.16 $m^3/h$.

The present invention constitutes a new pneumatic metering device which is simpler and more reasonably priced than previous metering devices, and which has low air consumption, low construction height but at the same time great metering accuracy, independent of the filling level in the tank or store. In this connection it should be noted that the present invention as defined in the claims is not limited to a design in which the metering device is fitted under a tank as shown in FIG. 1. The metering device, or rather its inlet, can thus be attached to any type of store or source of material in the form of a silo, a transport pipe, a channel or similar structure.

We claim:

1. A pneumatic metering device for metering accurate doses of powdered material, said device comprising:

an elongated container defining therein a closed channel, said container having an inlet for introduction into said channel of powdered material from a source and an outlet for discharge of powdered material from said channel;

a fluidizing element positioned at a base of said container;

a gas inlet for introducing fluidizing gas to said fluidizing element to fluidize powdered material in said channel above substantially all portions of said base except for a portion thereof beneath said inlet, such that powdered material in an area of said channel above said base portion remains continually unfluidized; and means for regulating the supply of gas through said gas inlet to supply controlled intermittent pulses of gas to said fluidizing element, and thereby for discharging, from the powdered material in said channel and through said outlet, doses of powdered material accurately metered as a function of duration of said pulses.

2. A device as claimed in claim 1, wherein said means comprises an electronically controlled magnetic valve.

3. A device as claimed in claim 1, further comprising a restriction member located adjacent said inlet, said restriction member projecting downwardly from a top of said container into said channel and extending transversely thereof.

4. A device as claimed in claim 3, wherein said restriction member is movable toward and away from said inlet.

5. A device as claimed in claim 1, wherein said means is operable to control said pulses such that each said pulse results in a corresponding dose of the powdered material that is less than the amount of powdered material in said channel.

* * * * *